May 20, 1958  A. TAUPIN  2,835,272
LOCK
Filed Nov. 24, 1953  2 Sheets-Sheet 1

May 20, 1958 A. TAUPIN 2,835,272
LOCK
Filed Nov. 24, 1953 2 Sheets-Sheet 2

United States Patent Office 2,835,272
Patented May 20, 1958

2,835,272

LOCK

André Taupin, Marseille-les-Aubigny, France

Application November 24, 1953, Serial No. 394,149

Claims priority, application France November 25, 1952

6 Claims. (Cl. 137—614.13)

This invention relates to locks for conveying a body from an upper duct or container into a lower duct or container and more particularly to systems wherein the ducts or containers do not communicate with each other to avoid the passage of air from one to the other especially if the pressures in the ducts are different.

Known locks of this type generally comprise rotary metallic elements which require a very accurate machining and which wear down very quickly. Further the force necessary to drive such locks is comparatively great.

An object of the invention is to provide a lock which obviates these drawbacks.

A lock, according to one embodiment of the invention, comprises two flexible tubular hoses capable of being blocked by being twisted. One extremity of the device is secured to a support with an initial twist. The lock further includes a sleeve or cylindrical element, hermetically secured intermediate the two hoses and means for imparting to the sleeve a reciprocating rotation which, when it takes place in one direction, causes the upper hose to close and the lower hose to open, and which, when effected in the opposite direction, causes the upper hose to open and the lower hose to close. The hoses may be either independent or of one piece.

The sleeve may be hand operated such as, for example, by a cable or the like. The sleeve may also be operated by a power source such as by the use of the vacuum existing in an associated air circuit or by means of a pulsator.

Where the lock is provided between two ducts or containers in one of which the pressure varies periodically, the device may be placed in an air-tight enclosure and the weight of the sleeve may be so determined that the maximum vacuum tends to displace the sleeve upwardly, thus closing one hose and opening the other one and the sleeve to fall down due to gravity when the vacuum decreases. The operation then takes place automatically.

The means for operating the sleeve may also comprise, in combination with a power source, means actuated by the vertical displacement of the sleeve as it rotates to causes the direction of said rotation to change; for instance, movable abutments may also be provided which are displaced by the sleeve reaching the end of its travel and which actuate a mechanism for reversing the operation. The lock operates automatically.

The lock will advantageously comprise a cylindrical element provided in at least one hose, to reduce the twisting angle which it is necessary to give to it. This element may be secured to either or the other support or to the sleeve; in this latter arrangement, it will be movable with respect to the supports.

There is described, hereinafter, by way of non limitative examples, various embodiments of a lock according to the invention, with reference to the attached drawings.

Figure 1:
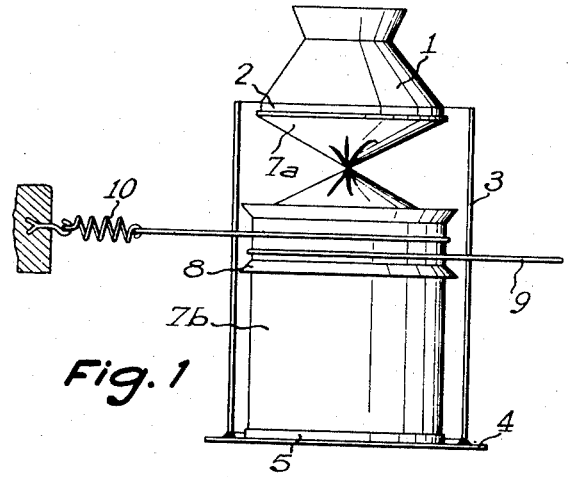
Fig. 1 is a front view of a first embodiment of the invention.
Figure 2:
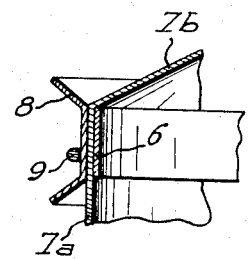
Fig. 2 is an axial cross-section view of this embodiment.

The lock illustrated in Figs. 1 and 2 comprises a frustoconical funnel 1 provided with a lower flange 2 and connected through one or more vertical columns 3 to a supporting plate 4 on which is provided a second flange 5. The flanges 2 and 5 are connected through a cylindrical envelope made of a flexible material such as rubber or nylon.

A sleeve 6 is provided within the envelope substantially at the middle of the height thereof and forms two hoses 7a—7b. The sleeve 6 is held in position by an outer flange 8 in the shape of a grooved pulley. Said two hoses 7a—7b are so assembled with the flanges 2 and 5 respectively that one of the hoses may be twisted by at least 180° with respect to the other one, as shown on the drawing.

A cable 9 is wound about the grooved pulley 8. One extremity of said cable such as, for example, the one which must be pulled to twist the upper hose 7a and untwist the lower hose 7b, is connected to a control member which may be, for example hand operated. The other extremity of the cable is fixed to a spring 10.

Figure 3A:
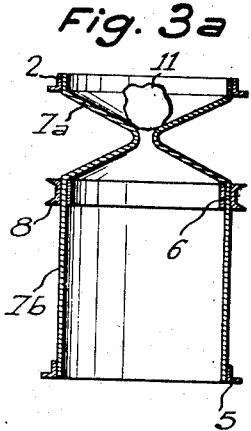
Figs. 3a–3d are diagrams illustrating the operation of the lock.
Figure 3B:
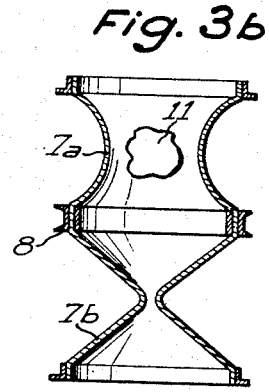
Figure 3C:
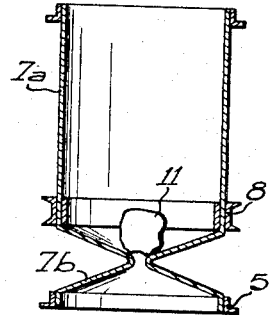
Figure 3D:
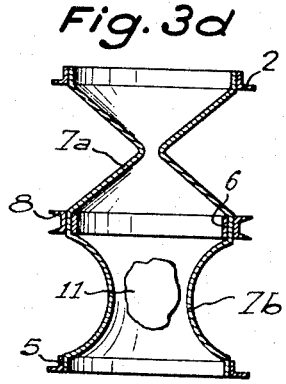

Figs. 3a–3d illustrate how a lock according to the invention operates. In Fig. 3a, a mass 11 is placed at the upper part of hose 7a which is twisted whereas the hose 7b is not. By twining the element 8, the hose 7b closes while the hose 7a opens to allow the mass 11 to pass into the part of the envelope in register with the pulley 8 (Fig. 3b) which thus comes into contact with the hose 7b (Fig. 3c). By twining the element 8 in the opposite direction subsequently, the hose 7b opens and the mass 11 leaves the lock (Fig. 3d).

Figure 4:
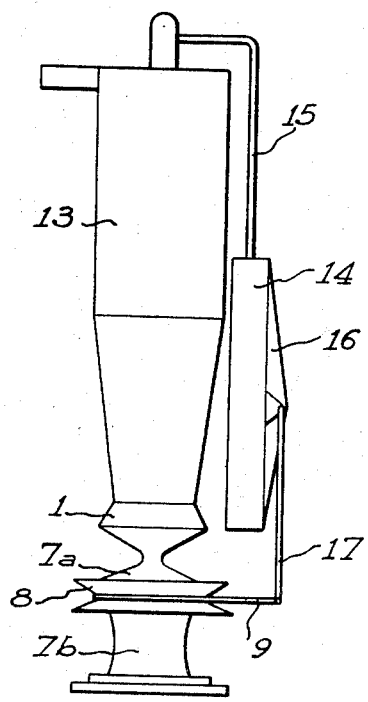
Fig. 4 is a front view of another embodiment of the invention.

Fig. 4 illustrates another embodiment in which the funnel is mounted on the upper part of a cyclone 13. To control the rotation of the element 8, a pulsator with an individual reversing device has been provided, the pulsator comprising a chamber 14 connected through a duct 15 to the upper part of the cyclone 13 and being closed by a membrane 16. The latter is integral with a small connecting rod 17 to which is secured the control extremity of the cable 9. It is apparent that under such circumstances, the rotation of the element 8 is controlled automatically.

Figure 5:
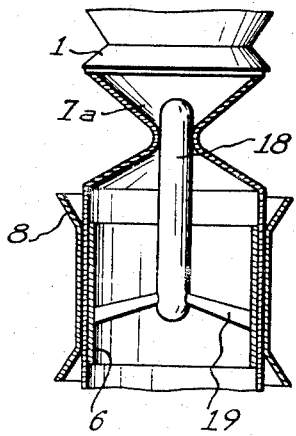
Fig. 5 is an axial cross-section of a further embodiment of the invention.

In the embodiment of Fig. 5, a mandrel 18 is provided in the hose 7a and coaxially therewith. Said mandrel may be secured to the corresponding flange 2 or, as illustrated, to the sleeve 6 by means of clamps 19.

Figure 6:
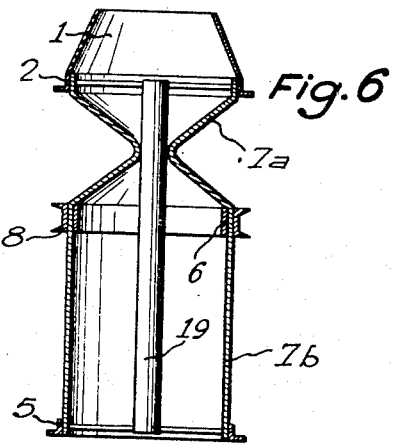
Fig. 6 is an axial cross-section of a still further embodiment.

In the embodiment of Fig. 6, the flange 5 carries a vertical axial column 19 at the upper part of which is secured the flange 2. This column extends through the two hoses 7a and 7b.

What I claim is:

1. A lock comprising two flexible tubular hoses capable of being closed off by being twisted and arranged in substantially co-axial manner with adjacent and remote ends, a sleeve air-tightly secured to said two hoses at the adjacent ends, supports for fixedly supporting the remote ends of said hoses, the two hoses being provided with a reverse twist and means for rotating the adjacent ends and the sleeve, the rotation in one direction of said adjacent ends causing the closing of one of the hoses and the opening of the other hose and the rotation of said adjacent ends in the opposite direction causing the opening of said one hose and the closing of said other hose.

2. A lock as claimed in 1, in which the two hoses are of one piece.

3. A lock as claimed in 1, in which the means for rotating the adjacent ends and the sleeve comprises a hand control member.

4. A lock as claimed in 1 in which the means for rotating the adjacent ends and the sleeve comprises a power source.

5. A lock as claimed in 1 comprising a cylindrical element provided in at least one hose.

6. A lock as claimed in claim 1 in which the two flexible tubular hoses are made from a non-elastic material.

References Cited in the file of this patent

UNITED STATES PATENTS

| | | |
|---|---|---|
| 844,158 | Lucke | Feb. 12, 1907 |
| 1,024,859 | Klein | Apr. 30, 1912 |
| 1,521,986 | Beaver | Jan. 6, 1925 |
| 1,711,525 | Forsberg | May 7, 1929 |
| 2,222,083 | Lintz | Nov. 19, 1940 |
| 2,379,483 | Hapgood | July 3, 1945 |
| 2,657,004 | Lovington | Oct. 27, 1953 |

FOREIGN PATENTS

| | | |
|---|---|---|
| 360,943 | Great Britain | of 1931 |